US007454304B2

(12) United States Patent  
Johansen et al.

(10) Patent No.: US 7,454,304 B2
(45) Date of Patent: Nov. 18, 2008

(54) PEAK WEIGHT DETECTOR AND METHOD

(75) Inventors: Steven L Johansen, Waterford, WI (US); Jerome Bump, Fort Atkinson, WI (US)

(73) Assignee: Digi-Star, LLC, Fort Atkinson, WI (US)

(*) Notice: Subject to any disclaimer, the term of this patent is extended or adjusted under 35 U.S.C. 154(b) by 272 days.

(21) Appl. No.: 11/536,822

(22) Filed: Sep. 29, 2006

(65) Prior Publication Data

US 2008/0078587 A1 Apr. 3, 2008

(51) Int. Cl.
*G01G 23/01* (2006.01)
*G01G 19/08* (2006.01)

(52) U.S. Cl. .................... 702/101; 177/25.19; 177/136; 177/185; 177/50; 702/174

(58) Field of Classification Search ... 177/25.11–25.19, 177/50, 185, 136; 702/101, 102, 174, 175
See application file for complete search history.

(56) References Cited

U.S. PATENT DOCUMENTS

| 4,316,384 A | * | 2/1982 | Pommer et al. ................ 73/76 |
| 4,379,495 A | * | 4/1983 | Cocks et al. .................... 177/1 |
| 4,836,304 A | * | 6/1989 | Paul ........................... 177/185 |
| 5,585,604 A | * | 12/1996 | Holm .......................... 177/133 |
| 5,650,930 A | * | 7/1997 | Hagenbuch .................. 701/50 |
| 6,215,078 B1 | * | 4/2001 | Torres et al. ............. 177/25.15 |
| 6,232,565 B1 | * | 5/2001 | Gottlober .................... 177/136 |
| 6,572,257 B2 | | 6/2003 | Bump |

* cited by examiner

*Primary Examiner*—Randy W Gibson
(74) *Attorney, Agent, or Firm*—Nicholas A. Kees; Godfrey & Kahn, S.C.

(57) ABSTRACT

A peak weight detecting system and method which analyzes signals generated by a load cell indicating a load within a container. The signal indicates a weight which is compared with a stored peak weight. If the new weight exceeds the stored weight, the new weight is verified by comparison to a weight indicated by a second signal from the load cell. If the weights indicated by the first and second signals are within a specified percentage of each other, the weight indicated by the first signal may displace the stored peak weight and may be stored as a new peak weight.

29 Claims, 2 Drawing Sheets

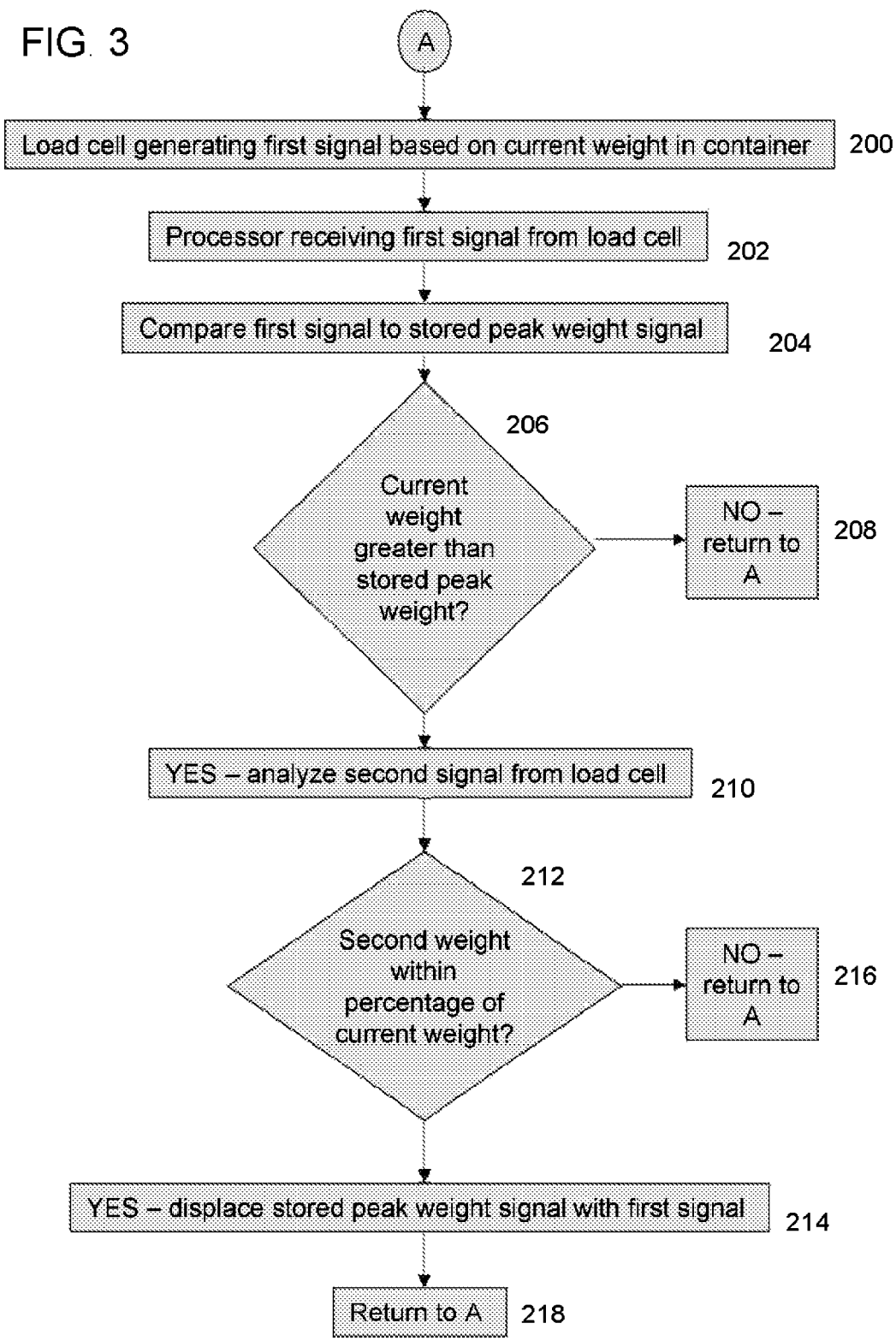

PEAK WEIGHT DETECTOR AND METHOD

BACKGROUND

In the agricultural industry, conventional load hauling trailers or wagons are used for a variety of purposes. One of these uses is to mix, carry and distribute feed for animals or livestock. Many of these wagons combine all of the mixing, hauling and distribution into a single implement and thus require a variety of devices or features be incorporated into the wagon. Due to the complex nature of the wagons, it is not uncommon for purchasers of the wagons to return the wagons to the manufacturer, distributor or dealer for warranty repairs or service. Experience by the dealers, distributors and manufacturers indicates that at least a significant proportion of the warranty claims are due to users exceeding the weight limits which the wagons are designed and built to handle.

Many of these conventional wagons do incorporate a load cell or some other weight measuring device for use in loading the wagons with appropriate proportions of feed or other loads. These load cells are typically accurate while the wagon is generally stationary, such as while loading or unloading. These load cells are typically not dampened or configured to indicate an accurate weight when the wagon is moving and thus subject to a more dynamic array of forces. It is also conventional for wagons including a load cell to include a digital readout positioned to be viewed by an operator, as well as for storing one or more of the weights indicated by the load cell.

Thus, load information may be available from the load cell through the processor. However, due to the static load forces to which the wagon is subjected while stationary and the dynamic forces to which the wagon is subjected while moving, such a load cell and associated read out cannot conventionally distinguish between the two. Without information from the load cell that can indicate clearly and reliably if a wagon returned for repair was overloaded or failed for some other reason, the dealer, distributor or manufacturer cannot tell if a wagon is properly designed for its intended use. This may lead to excess warranty repairs and to the sale and use of wagons which are not suitable to haul the loads for which they are rated.

Improvements to the measurement of peak weights in load cell equipped wagons and other mobile containers, such as shown in U.S. Pat. No. 6,572,257, are desirable. The disclosure of U.S. Pat. No. 6,572,257 is incorporated herein by reference.

SUMMARY OF THE INVENTION

The present invention relates to a method of detecting a peak weight for a mobile chassis with a load carrying container mounted to the chassis and a load cell positioned between the chassis and the container. A processor receives signals from the load cell and compares the signals with a peak weight signal stored by the processor. If a first weight signal from the load cell indicates a greater weight in the container than the stored weight, a second signal from the load cell is compared to the first signal. If the first and second signals are within a predetermined percentage of each other, the first weight signal displaces the stored weight signal.

The present invention further relates to a peak weight detector that compares a first weight signal from a load cell with a stored weight signal to determine if the first weight signal is greater than the stored weight signal. If the first signal is greater, a second weight signal at a predetermined time interval is compared with the first signal. The first weight signal displaces the stored weight signal if the second weight signal is at least a predetermined percentage of the first signal.

BRIEF DESCRIPTION OF THE DRAWING

The accompanying drawing figures, which are incorporated in and constitute a part of the description, illustrate several aspects of the invention and together with the description, serve to explain the principles of the invention. A brief description of the drawing figures is as follows:

FIG. 3 is a flow chart showing steps of a method of detecting peak weight according to the present invention.

DETAILED DESCRIPTION

Figure 1:
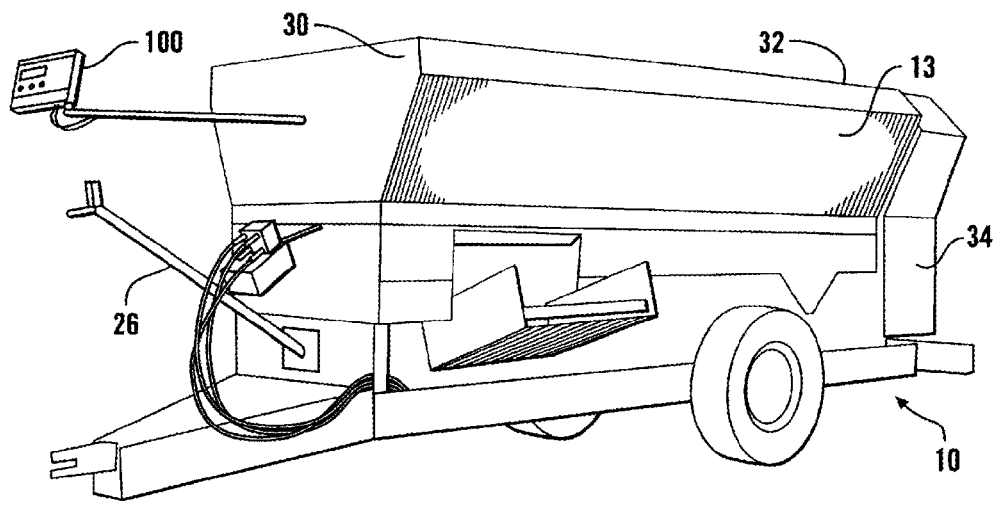
FIG. 1 is a side perspective view of a trailer-style feed mixing wagon incorporating the present invention.
Figure 2:
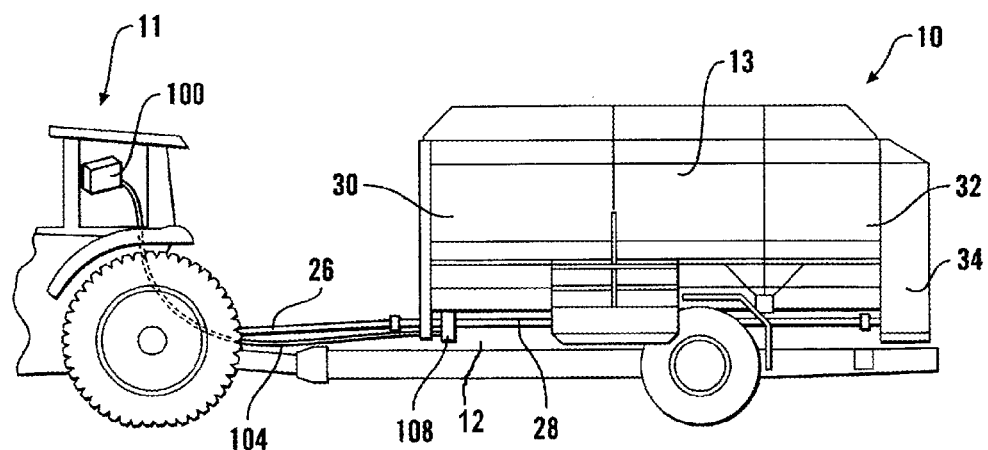
FIG. 2 is a partial side elevation of the feed mixer of FIG. 1 as attached to a tractor and showing a cut-away view of the drive train.

Feed mixers in the agricultural market are used to mix or blend a variety of forage products (such as hay, corn, cotton seed, etc.) together before delivering it to livestock as feed. As seen in FIGS. 1 and 2, feed mixers are generally constructed from a large receptacle or container 10 with an open top for receiving the forage products, mounted on a chassis 12. Positioned within the receptacle 10 may be some type of rotating device used to stir, mix and possibly chop the forage products.

As best illustrated in FIG. 2, at the front section 30 of receptacle 10 may be a power take-off shaft (PTO) 26 that connects to a tractor 11 or other source of rotational power. A line shaft 28 extends underneath the mixer receptacle 10 from the receptacle front section 30 to the rear section 32, and is connected so as to transfer the rotational power from the PTO to a drive assembly contained in housing 34, which in turn may drive augers or other mixing elements (not shown) within the mixer receptacle.

A device of the present invention may include an electronic weight calculator and display, shown in the FIGS. 1 and 2 and referred to herein as an indicator 100, the display unit of which may be positioned near the operator for convenience. Indicator 100 receives electrical signals from the various hardware described herein. Indicator 100 includes a processor to transform the signals received from the hardware into values corresponding to weights held within container 10. These values relating weight within the container may be held by the processor either temporarily for analysis and verification, as will be described below, or more persistently to indicate maximum or peak loads that were placed within container 10.

In operation, an operator loads the receptacle 10 using a feed recipe specially formulated for a given herd of animals, e.g., dairy cows in lactation. After loading, the mixing described above is carried out. The forage products are often added by weight. The hardware used to sense the weight in container 10 may include a load cell, shown generally as black box 108 in FIG. 2, positioned between the chassis 12 and the container. Alternatively, one or more load cells 108 may be mounted to the axles and hitch of the container 10, or any other suitable location or locations that provide reliable weight detection in use. All of the load cells to be used are electronically connected to indicator 100 by any suitable communication device, such as by an electrical cable 104. Wireless communication may also be possible.

Operation of a peak weight detecting system including load cells 108 and indicator 100 with an integral processor is shown in the flow chart of FIG. 3. One of the issues of determining a peak load in a mobile load carrying container, such as container 10, is that the container may be subjected to dynamic loading during movement. Such dynamic loading can cause spikes in weight to be signaled by the load cell as the container is subjected to different vertical accelerations during movement, such as by bumps, potholes, or other irregularities in the surface over which the container is moved. Some of these momentary accelerations may result in signals from the load cell indicating a carried weight well in excess of the actual weight within the container.

According to the present disclosure, a verification process is carried out by the processor of the system to validate the weight indicated by a particular signal from the load cell. As described above, it is desirable to record a peak weight within the container to analyze structural or other failures that require repair, to determine if the failures were due to overloading misuse or from some other cause. Thus, it is desirable that the processor include some form of persistent memory, of information relating to peak weight carried by the container 10, that may be accessed by a service technician. This memory may store a single peak weight or may accumulate a series of peak weights, for example five, which may indicate whether the container has been subjected to repeated or multiple instances of overloading.

Each of the peak weights may be stored by the processor with a time or date stamp to indicate how recent the overloading occurred. This time or date information can then be used to determine if any such overloading may have been a proximate cause of a particular failure of the container. Other uses for such information may include but are not limited to verifying compliance with contract terms for use of the container, or compliance with administrative or legal constraints on the use or movement of the container.

It may be desirable that the peak weights stored by the processor be secured from unauthorized access or manipulation, for obvious reasons. Such security may be provided by any of a variety of conventional approaches, such as passwords, hardware or software keys, encryption, or by requiring a proprietary series of inputs to the processor through a keypad or other input device communicating with indicator 100.

Referring now to FIG. 3, a process for verifying a peak weight held within container 10 as measured by load cell(s) 108 and recorded by indicator 100 is illustrated. The process for recording and verifying a peak weight within container 10 is initiated at position A. As a first step 200, load cell(s) 108 generate a first signal based on the amount of weight measured in container 10. This is an instantaneous reading and may be subject to a variety of external forces, such as may be generated by moving container 100 down a bumpy farm road. This first signal is received by the processor within indicator 100 at step 202. The processor then compares the first signal with a stored peak weight signal held in memory, at step 204.

The stored peak weight can be a value from a previous iteration of the process described herein or can be a default value defined for use when there has been no prior peak weight recorded or when the stored peak weight has been cleared. Such a clearance of peak weight can be through operation by a technician or other authorized person or may be through error or faulty operation of the processor. The inclusion of a distinct default value for the peak weight stored by the processor can be used as an indication that the peak weight storage has been tampered with or that a failure of the peak weight system has occurred. An example of a distinct default weight may be the exact load rating of container 10.

Once the first signal from the load cells 108 has been compared to the stored peak weight signal, at decision step 206 the processor then determines whether the weight indicated by the first signal is greater than the peak weight indicated by the stored signal. A tolerance may be included at this stage. If the weight indicated by the first signal is less than the peak weight, or less than the peak weight and the tolerance, the first signal is discarded and at step 208 the process returns to position A to begin again. The process can then recycle on set intervals, such as every second, every five seconds, etc., as may be appropriate for the particular application in which the system is incorporated. As an example of the tolerance described above, the processor may determine that the weight indicated by the first signal is only five percent greater than the peak weight indicated by the stored signal, in which case the first signal would be discarded. Such a tolerance is to be selected so as ensure that only significant increases to the stored peak weight will be recorded.

If the first signal indicates a weight greater than the peak weight, or the peak weight and any specified tolerance, the first signal may be held in a temporary memory within the processor, pending verification. This verification is accomplished by the processor receiving and analyzing a second signal from the load cell at step 210. The weight indicated by this second signal is compared to the weight indicated by the first signal at step 212. If the weight indicated by the second signal is within a predetermined or specified percentage of the weight indicated by the first signal, the first signal may be verified as indicating a new peak weight.

The use of a percentage in the verification process comparing the weights indicated by the first and second signals will aid in the weeding out of momentary large load spikes which may be caused by vertical acceleration during transport of container 10 or a spike due to a load being dropped into container 10. While it is possible that there will be a second load spike at the specified time interval of the second signal, it is not likely that such a second load spike will correspond closely enough to the first load spike to trigger an erroneous peak weight to be stored. An example of a workable verification percentage may require the weight indicated by the second signal to be at least ninety-five percent of the weight indicated by the first signal. Other suitable percentages may be determined experimentally.

As indicated above, if at step 212 the weights indicated by the first and second signals are within the specified percentage, then at step 214 the weight indicated by the first signal is used to displace the peak weight stored by the processor and become the new peak weight. If, as discussed above, the processor includes memory for a plurality of peak weights, the new peak weight indicated by the first signal may become the new top peak weight and the stored peak weight may be displaced to a second memory position. Similarly, if the processor includes memory for a plurality of peak weights and the first signal indicates a weight greater than the least of that plurality of weights, then the weight corresponding to the first signal is inserted into the memory, the weights less than that weight demoted by one in the order, and the lowest weight dropped out. Alternatively, the peak weight indicated by second signal could be used in place of the peak weight indicated by the first signal, in step 214.

If the peak weight indicated by the first signal is not verified by the weight indicated by the second signal, at step 216 the first signal is discarded and the process returns to the beginning at position A.

Once the weight indicated by the first signal has been tested against the stored peak weight and verified, and the new peak weight has displaced the prior peak weight, at step 218 the process returns to the beginning, position A, to recycle on a specified sampling interval of time. While the sampling of signals from load cells 108 may be continuous, the sampling is preferred to be performed at a selected time interval. This time interval may be selected based on the characteristics of the components of the system, such as the processor or the load cell, or may be based on the characteristics of the container or loads being carried, or the manner in which the container is being transported.

It is anticipated that the tolerance by which the weight indicated by the first signal must exceed the stored peak weight may be zero, meaning that the weight indicated need only exceed the stored weight. It is also anticipated that the percentage that the weight indicated by the second signal is compared with the weight indicated by the first signal may be one hundred percent, meaning that the second signal indicates a weight at least equal to the weight indicated by the first signal.

Included within the scope of the present disclosure are a) other combinations of tolerances and percentages between the weights indicated by the first and second signals and the stored peak weight; b) storage of one or a plurality of peak weights; and c) sample rates at any of a variety of fixed or variable intervals.

While much of this disclosure is described with respect to agricultural wagons, such as might be used for mixing forage for animals, it is expressly understood that the scope of the current disclosure is not intended to be limited to such agricultural applications. It is intended that elements of the current disclosure might be incorporated for use with any mobile load carrying apparatus which may have a load cell and may be structurally, administratively, legally or otherwise limited in the weight of material that may be carried. Examples of these alternative applications might include over-the-road trucks and trailers, shipping containers and container transports, dump trucks or other commodity hauling vehicles or trailers, and other similar vehicles or conveyances.

While the process and apparatus hereinbefore described is effectively adapted to fulfill the aforesaid objects, it is to be understood that the invention is not intended to be limited to the specific preferred embodiments set forth above. Rather, it is to be taken as including all reasonable equivalents to the subject matter of the appended claims.

What is claimed is:

1. A method of detecting a peak weight, the method comprising:
   providing a mobile chassis, a load-carrying container mounted to the chassis, a load cell positioned between the chassis and the container, the load cell configured to generate an electronic signal corresponding to the weight of the container including the load, and a processor configured to receive the signal from the load cell;
   the load cell generating a signal based on the weight of the container;
   the processor receiving the signal from the load cell;
   the processor comparing the signal received against a previously stored signal corresponding to a peak weight of the container;
   the processor stores the signal received from the load cell if the signal indicates a weight of the container greater than the previously stored peak weight signal;
   the processor verifying the newly stored peak weight signal by comparing the newly stored peak weight signal with a second signal from the load cell at predetermined time interval after the newly stored peak weight signal is received;
   the processor displacing the previously stored peak weight signal with the newly stored peak weight signal if the second signal corresponds with a weight that is within a predetermined percentage of the newly stored peak weight signal.

2. The method of claim 1, wherein the predetermined time interval is ten seconds.

3. The method of claim 1, wherein the predetermined percentage is 95%.

4. The method of claim 1, wherein the container has a specified load capacity and the processor only stores a peak weight signal that is a predetermined amount above the load capacity.

5. The method of claim 4, wherein the predetermined amount is 2.5%.

6. The method of claim 1, wherein the processor is configured to store signals corresponding to a plurality of peak weights indicated by signals from the load cell and verified by a second signal.

7. The method of claim 6, wherein the processor is configured to store the signals corresponding to the five greatest peak weights.

8. The method of claim 1, wherein the processor stores a time stamp with the peak weight signal, the time stamp indicating when the peak weight signal was received.

9. A mobile peak weight detector comprising:
   a chassis;
   a load-carrying container mounted to the chassis;
   a load cell positioned between the chassis and the container, capable of generating signals corresponding to a weight of the container and any loads placed in the container;
   a processor electronically connected to the load cell and including storage for a signal corresponding to a peak weight of the container and any load placed in the container;
   the processor configured to receive signals from the load cell, to compare a first signal corresponding with a peak weight greater than the peak weight corresponding to the stored peak weight signal with a second signal from the load cell at a predetermined time interval after the first signal, and to displace the stored peak weight signal with the first signal if the second signal indicates a weight within predetermined percentage of the peak weight indicated by the first signal.

10. The peak weight detector of claim 9, wherein the processor includes memory to store a plurality of peak weight signals.

11. The peak weight detector of claim 10, wherein the processor is configured to store signals corresponding to the five greatest peak weights detected.

12. The peak weight detector of claim 9, wherein the second signal corresponds to a weight within 95% of the peak weight corresponding to the first signal.

13. The peak weight detector of claim 9, wherein the container has a predetermined load capacity and the processor only stores signals corresponding to peak weights that are a predetermined percentage greater that the load capacity of the container.

14. The peak weight detector of claim 13, wherein the processor only stores peak weight signals corresponding to weights which are more than 2.5% greater than the load capacity.

15. The peak weight detector of claim 9, wherein the chassis is a trailer chassis.

16. A method of detecting a peak weight, the method comprising:
   generating a first weight signal corresponding to the weight of a load in a container;

comparing the first weight signal against a previously stored signal corresponding to a prior peak weight of the load;

if the first weight signal indicates a weight of the container greater than the weight of the previously stored peak weight signal, storing the first weight signal;

accepting a second weight signal corresponding to the weight of the load at predetermined time interval after the newly stored peak weight signal is received;

verifying the newly stored peak weight signal by comparing the newly stored peak weight signal with the second weight signal;

displacing the previously stored peak weight signal with the newly stored peak weight signal if the second weight signal corresponds with a weight that is within a predetermined range of the newly stored peak weight signal.

17. The method of claim 16, wherein the predetermined time interval is ten seconds.

18. The method of claim 16, wherein the predetermined range is 95%.

19. The method of claim 16, wherein the container has a specified load capacity and the processor only stores a peak weight signal that is a predetermined amount above the load capacity.

20. The method of claim 19, wherein the predetermined amount is 2.5%.

21. The method of claim 16, further comprising storing signals corresponding to a plurality of peak weights indicated by signals from the load cell and verified by a second signal.

22. The method of claim 16, further comprising storing the signals corresponding to the five greatest peak weights.

23. The method of claim 16, further comprising storing a time stamp with the peak weight signal, the time stamp indicating when the peak weight signal was received.

24. A process for detecting a peak weight, the process comprising:

accepting a first weight signal from a load cell corresponding to the weight of a load in a container;

accepting a second weight signal from the load cell corresponding to the weight of the load at predetermined time interval after the first weight signal is accepted;

comparing the first weight signal against the second weight signal, rejecting both signals if the second weight signal is at least a predetermined percentage less than the first weight signal, and restarting the process;

if the second weight signal is not less than the first weight signal by at least the predetermined percentage, comparing the first weight signal to a previously stored signal corresponding to a prior peak weight of the load; and if the first weight signal indicates a weight of the container greater than the weight of the previously stored peak weight signal, displacing the previously stored peak weight signal with the newly stored peak weight signal.

25. The method of claim 24, wherein the predetermined time interval is ten seconds.

26. The method of claim 24, wherein the predetermined percentage is 95%.

27. The method of claim 24, further comprising storing signals corresponding to a plurality of peak weights indicated by signals from the load cell and verified by a second signal.

28. The method of claim 24, further comprising storing the signals corresponding to the five greatest peak weights.

29. The method of claim 24, further comprising storing a time stamp with the peak weight signal, the time stamp indicating when the peak weight signal was received.

* * * * *